US008140928B2

(12) United States Patent
Umesh et al.

(10) Patent No.: US 8,140,928 B2
(45) Date of Patent: Mar. 20, 2012

(54) RADIO COMMUNICATIONS APPARATUS AND METHOD USED IN A MOBILE COMMUNICATIONS SYSTEM

(75) Inventors: Anil Umesh, Yokohama (JP); Sadayuki Abeta, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 599 days.

(21) Appl. No.: 12/305,332

(22) PCT Filed: Jun. 15, 2007

(86) PCT No.: PCT/JP2007/062159
§ 371 (c)(1),
(2), (4) Date: May 6, 2009

(87) PCT Pub. No.: WO2007/148630
PCT Pub. Date: Dec. 27, 2007

(65) Prior Publication Data
US 2010/0293427 A1    Nov. 18, 2010

(30) Foreign Application Priority Data

Jun. 20, 2006 (JP) ................................. 2006-170704

(51) Int. Cl.
*H04L 1/18* (2006.01)
(52) U.S. Cl. ....................................... 714/748; 714/749
(58) Field of Classification Search .................. 714/748, 714/749
See application file for complete search history.

(56) References Cited

U.S. PATENT DOCUMENTS

| | | | | |
|---|---|---|---|---|
| 5,245,616 A | * | 9/1993 | Olson ........................... | 714/748 |
| 6,857,095 B2 | * | 2/2005 | Suumaki et al. .............. | 714/748 |
| 6,909,718 B1 | * | 6/2005 | Aramaki et al. .............. | 370/394 |
| 7,007,219 B2 | * | 2/2006 | Haulk et al. .................. | 714/749 |
| 7,124,343 B2 | * | 10/2006 | Moulsley et al. ............. | 714/748 |
| 7,673,211 B2 | * | 3/2010 | Meyer et al. .................. | 714/748 |
| 7,724,657 B2 | * | 5/2010 | Rao et al. ...................... | 370/229 |
| 7,733,914 B2 | * | 6/2010 | Baker et al. ................... | 370/474 |
| 2002/0174395 A1 | * | 11/2002 | Chen et al. .................... | 714/748 |

(Continued)

FOREIGN PATENT DOCUMENTS

JP    2000-324161 A    11/2000

(Continued)

OTHER PUBLICATIONS

Office Action in Taiwanese Patent Application No. 096122045 mailed Oct. 19, 2010, with English translation thereof (6 pages).

(Continued)

*Primary Examiner* — Yolanda L Wilson
(74) *Attorney, Agent, or Firm* — Osha Liang LLP

(57) ABSTRACT

A radio communications apparatus having a retransmission function that has a determination portion configured to receive an error detection result obtained for a first packet transmitted to a destination apparatus and determine in a first sub-layer whether the error detection result is a positive acknowledgement; a transmission portion configured to transmit a second packet following the first packet to the destination apparatus; a timer portion configured to measure a predetermined period of time after the second packet is transmitted; and a report portion configured to report to a second sub-layer that is an upper sub-layer of the first sub-layer that the error detection result is the positive acknowledgement when no message is received from the destination apparatus during the predetermined period of time, the message indicating that the error detection result is falsely determined to be the positive acknowledgement.

2 Claims, 4 Drawing Sheets

U.S. PATENT DOCUMENTS

| | | | |
|---|---|---|---|
| 2005/0003910 A1 | 1/2005 | Nye et al. | |
| 2005/0013246 A1 | 1/2005 | Miyake et al. | |
| 2005/0204252 A1* | 9/2005 | Aramaki et al. | 714/748 |
| 2006/0045032 A1* | 3/2006 | Hamada | 370/278 |

FOREIGN PATENT DOCUMENTS

| | | |
|---|---|---|
| JP | 2005-510950 A | 4/2005 |
| JP | 2006-067099 A | 3/2006 |
| TW | 245519 B | 12/2005 |
| WO | 2004/077871 A1 | 9/2004 |

OTHER PUBLICATIONS

Patent Abstract, espacenet, in Japanese Publication No. TW245519 Publication date Dec. 11, 2005 (1 page).

Samsung, "MAC functions: ARQ," Tdoc R2-060907, Mar. 27-31, 2006, Athens, Greece, [online]. 3rd GPP TSG-RAN2 Meeting #52 [retrieved on Jul. 6, 2007], Retrieved from the Internet:<URL:http//www.3gpp.org/ftp/tsg_ran/WG2_RL2/TSGR2_52/Documents/R2-060907.zip>, 5 pages.

International Search Report issued in PCT/JP2007/062159, mailed on Jul. 17, 2007, with translation, 5 pages.

Written Opinion issued in PCT/JP2007/062159, mailed on Jul. 17, 2007, 3 pages.

Japanese Office Action for Application No. 2008-522436, mailed on Nov. 15, 2011 (5 pages).

Nokia, "HARQ-ARQ Interaction", 3GPP TSG-RAN WG2 Meeting #52, Athens, Greece, R2-060826, Mar. 27-31, 2006.

3rd Generation Partnership Project; Technical Specification Group Radio Access Network; High Speed Downlink Packet Access (HSDPA); Overall Description; Stage 2; (Release 5) 3GPP TS 25.308 V5.1.0 (dEC. 2001).

* cited by examiner

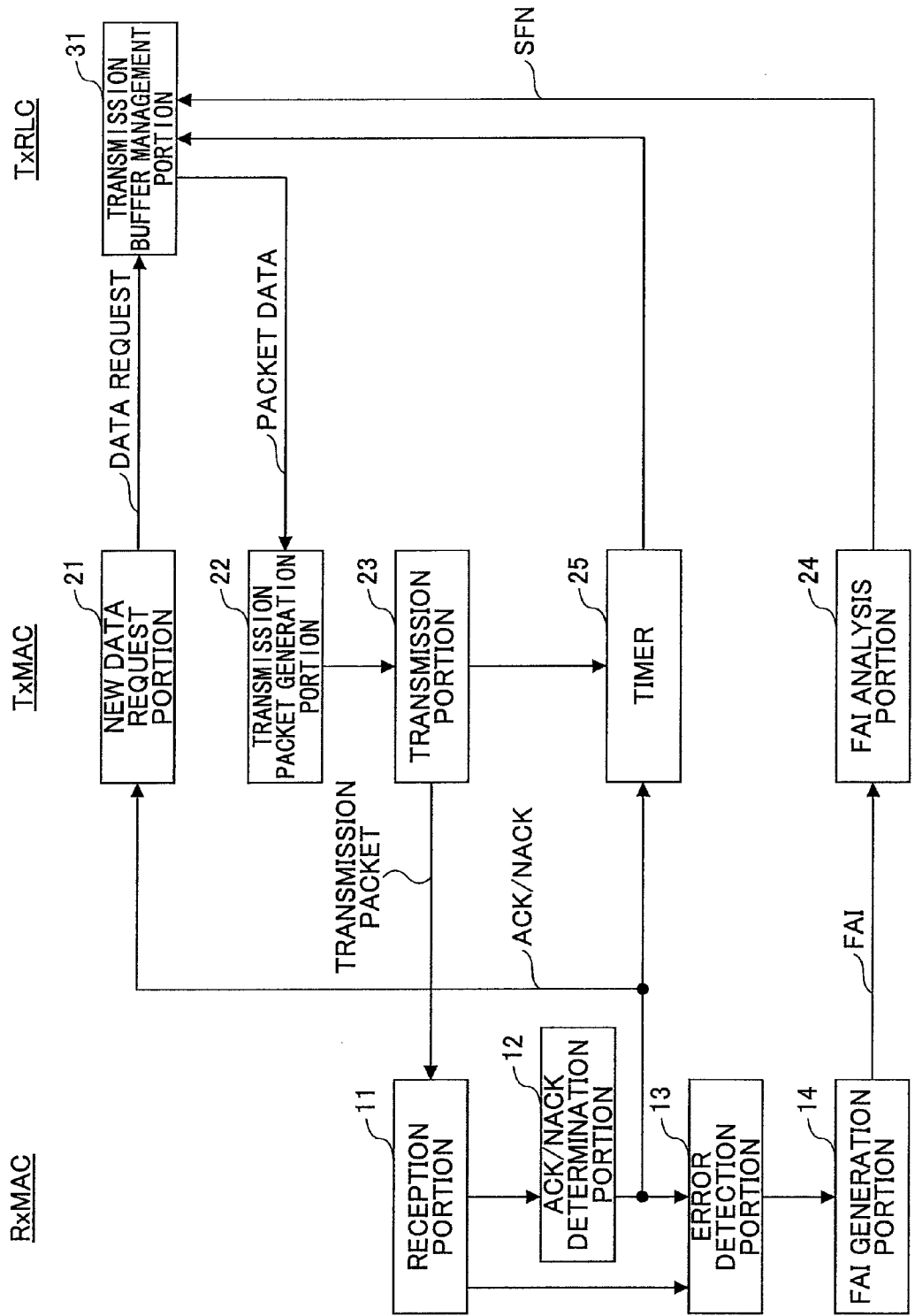

RADIO COMMUNICATIONS APPARATUS AND METHOD USED IN A MOBILE COMMUNICATIONS SYSTEM

TECHNICAL FIELD

The present invention relates to a technical field of mobile communications, specifically to a radio communications apparatus and a method used in a mobile communications system.

BACKGROUND ART

In this field of technology, research and development on a next generation mobile communications system including a radio access method, retransmission control, handover and the like has been advancing at a rapid rate.

FIG. 1 shows an example of a retransmission procedure. On the right-hand side of the drawing, operations of an entity (Tx MAC) of a Medium Access Control (MAC) sub-layer and an entity (Tx RLC) of a Radio Link Control (RLC) sub-layer on the transmitting side are shown. On the left-hand side of the drawing, operations of an entity (Rx MAC) of the MAC sub-layer and an entity (Rx RLC) of the RLC sub-layer on the receiving side are shown. In a downlink, a base station is a transmitter and a user apparatus is a receiver. In an uplink, the user apparatus is the transmitter and the base station is the receiver.

In steps S21, S22, a packet to be transmitted is prepared. The MAC sub-layer requests the packet to be transmitted from the RLC sub-layer (new data request). In response to the request, the packet to be transmitted is prepared in the MAC sub-layer. In the illustrated example, a sequence number of "zero" (SN=0) is given to this packet, i.e., a packet data unit (PDU).

As shown in step S11, the packet prepared in the transmitting side is transmitted to the receiving side. In this case, the packet data unit including user data specified by the sequence number (SN) is transmitted through a data channel, and other pieces of control information such as user identification information (UE-ID), a process number (Proc), and a new data indicator (NDI) are transmitted through a control channel. A system frame number (SFN) indicating absolute transmission timing within a cell is broadcasted through a broadcast channel, and accordingly is used.

The receiver that receives the control channel and the data channel along with the broadcast channel carries out, for example, a Cyclic Redundancy Check for the received packet in order to detect an error. Accordingly, the error detection result is negative (NACK) or positive (ACK). The former shows that an error beyond an acceptable range is detected, and the latter shows the contrary. In the illustrated example, no error is detected, or the error, if detected, is within the acceptable range (CRC:OK).

As shown by step S12, the error detection result is reported to the transmitting side. When the error is detected, the negative acknowledgement is reported to the transmitting side. The transmission side in turn specifies a packet related to the negative acknowledgement and then retransmits the specified packet. The packet transmitted from the transmitting side is stored in a buffer (retransmission buffer) after the radio transmission is completed, and discarded when a positive detection result is obtained. Therefore, when the negative detection result is detected, the packet that was already transmitted is identified and retransmitted.

In the illustrated example, the positive acknowledgement (ACK) is transmitted at step S12. Because the positive acknowledgement shows that a packet has been received without an error by the receiving side, the next packet may be transmitted. However, if it is identified later that the Tx MAC falsely determines that the error detection result is positive, it is difficult to retransmit the packet for which the error detection result should have been negative. This is because the packet is discarded and window control is advanced after the positive acknowledgement is reported to the Tx RLC layer.

In order to address such a concern, after the Tx MAC determines that the error detection result is positive, a timer is activated in the related art, so that a signal for reporting false determination has been made in the error detection is deferred for a fixed period of time. The acknowledgement may be referred to as a False Ack Indicator (FAI).

Then, subsequent packet data are prepared as shown in steps S23, S24 and transmitted as shown in step S13. In the illustrated example, a packet of SN=1 is transmitted along with pieces of control information Proc=0 and NDI=1 at timing of SFN=8.

When the FAI is not transmitted, the Tx MAC confirms that a predetermined period of time has passed, as shown by "EXPIRY OF TERM" in FIG. 1. With this, there is more assurance that the error detection result is determined to be positive.

As shown in step S25, a report indicating that the error detection result is positive is made to the upper layer (Tx RLC). As a result, the packet (SN=0) subjected to the report is discarded from the transmission buffer, and window control is advanced. Such a method is described, for example, in R2-060907, "MAC functions: ARQ", Samsung.

SUMMARY OF INVENTION

Problem to be Solved by the Invention

FIG. 2 shows a view for explaining a problem of the related art. It is assumed that a transmitter falsely determines that a receiver sends a positive acknowledgement in spite that the receiver sends a negative acknowledgement. In order to confirm whether the positive acknowledgement is correct, as described above, a timer is activated in order to monitor whether a predetermined period of time passes. Subsequent packets that can be transmitted are continuously transmitted. The receiver refers to a process number (Proc), a new data indicator (NDI), a serial number (SN) and the like, and takes account of the error detection result made in the past. Then, the receiver determines whether the false determination has been made in the transmitter.

When the transmitter falsely determines the positive acknowledgement in spite that the receiver sends the negative acknowledgement, a new packet rather than a retransmission packet is transmitted to the receiver. As a result, the receiver can know that the negative acknowledgement that has been sent before cannot be appropriately processed, the negative acknowledgement has been processed as the positive acknowledgement, and subsequent processes are advanced.

In response to the error detection result, the receiver produces an indicator including a system frame number (SFN) of the packet subjected to retransmission, and reports the indicator to the transmitting side. What is subjected to the retransmission is the packet for which the error detection result is negative, and the packet is identified from the SFN and the error detection result carried out after step S11. The transmitter extracts the system frame number included in the reported indicator. The transmitter has already known the sequence number of the packet transmitted at the timing of the system frame number. From the system frame number so transmitted, the sequence number of the packet to be retransmitted is specified. The specified sequence number is reported to the Tx RLC that manages transmission packets (local NACK), and subsequently the packet concerned is retransmitted to the receiving side. In such a manner, even when false determination about the error detection result (ACK/NACK) is made in the transmitter side, the receiving side can specify the packet to be retransmitted, thereby enabling appropriate retransmission control.

The predetermined period of time after the timer is activated should be long enough to allow the above procedures to be appropriately carried out. If the predetermined period of time is too short, acknowledgement of the false determination of ACK cannot be received in the predetermined period of time, which may increase probabilities of packet loss and deteriorated transmission quality. As shown in FIG. 2, the predetermined period of time includes a period T1 from when the false determination is made to when the next new data are transmitted, a period T2 from when the receiver carries out the error detection to when an acknowledgement signal of the false determination such as the FAI is transmitted, and a period T3 required to transmit the acknowledgement signal of the false determination such as the FAI. In a system where data transmissions of different users over the shared data channel are scheduled, a scheduling delay is expected to greatly vary depending on the number of users, a transmission rate requested by each user, and an available radio band width. Therefore, the period T1 has to be expectably the longest period in order to address all of these. The period T2 rarely varies and is relatively short because a transmission opportunity should be preferentially (instantaneously) assigned to the FAI taking into consideration that the FAI is an important signal, has a low amount of information, and is less frequently transmitted. The period T3 is not expected to greatly vary because the acknowledgement signal such as the FAI has a low amount of information, while the period T3 includes a transmission period. For example, the period T3 may be a few tens of milliseconds. From such a point of view, the predetermined period of time measured by the timer is set to be relatively long, especially due to the period T1.

If the predetermined period of time becomes relatively long, the Tx RLC cannot discard the packet, and the window control is delayed, which may raise a concern about reduced throughput in the system.

The present invention is directed to enhanced retransmission control function by appropriately adjusting a waiting time determined by a timer.

Means for Solving the Problem

According to an embodiment of the present invention, a radio communications apparatus having a retransmission function is used. The radio communications apparatus has a determination portion configured to receive an error detection result obtained for a first packet transmitted to a destination apparatus and determine in a first sub-layer whether the error detection result is a positive acknowledgement; a transmission portion configured to transmit a second packet following the first packet to the destination apparatus; a timer portion configured to measure a predetermined period of time after the second packet is transmitted; and a report portion configured to report to a second sub-layer that is an upper sub-layer of the first sub-layer that the error detection result is the positive acknowledgement when no message is received from the destination apparatus during the predetermined period of time, the message indicating that the error detection result is falsely determined to be the positive acknowledgement.

Advantage of the Invention

According to an embodiment of the present invention, retransmission control function can be enhanced by appropriately adjusting a waiting time determined by a timer.

BRIEF DESCRIPTION OF THE DRAWINGS

FIG. 4 is a functional block diagram of entities used in the example of the present invention.

Figure 1:
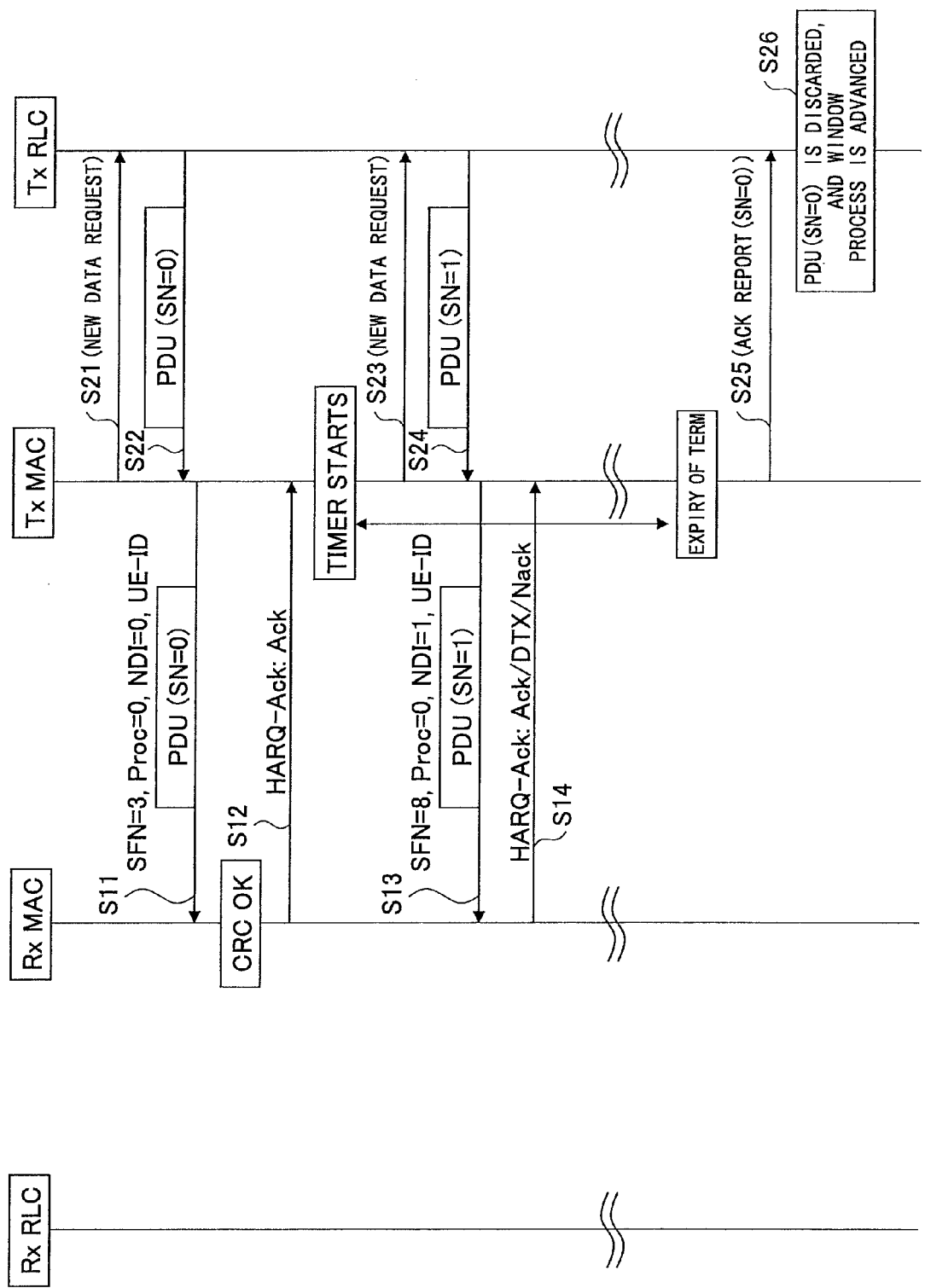
FIG. 1 is a flowchart showing operation procedures in order to address false determination of ACK/NACK, which may take place in related art.

LIST OF REFERENCE SYMBOLS 11 reception portion
12 ACK/NACK determination portion
13 error detection portion
14 FAI generation portion
21 new data request portion
22 transmission packet generation portion
23 transmission portion
24 FAI analysis portion
25 timer
31 transmission buffer management portion

BEST MODE FOR CARRYING OUT THE INVENTION

Figure 3:
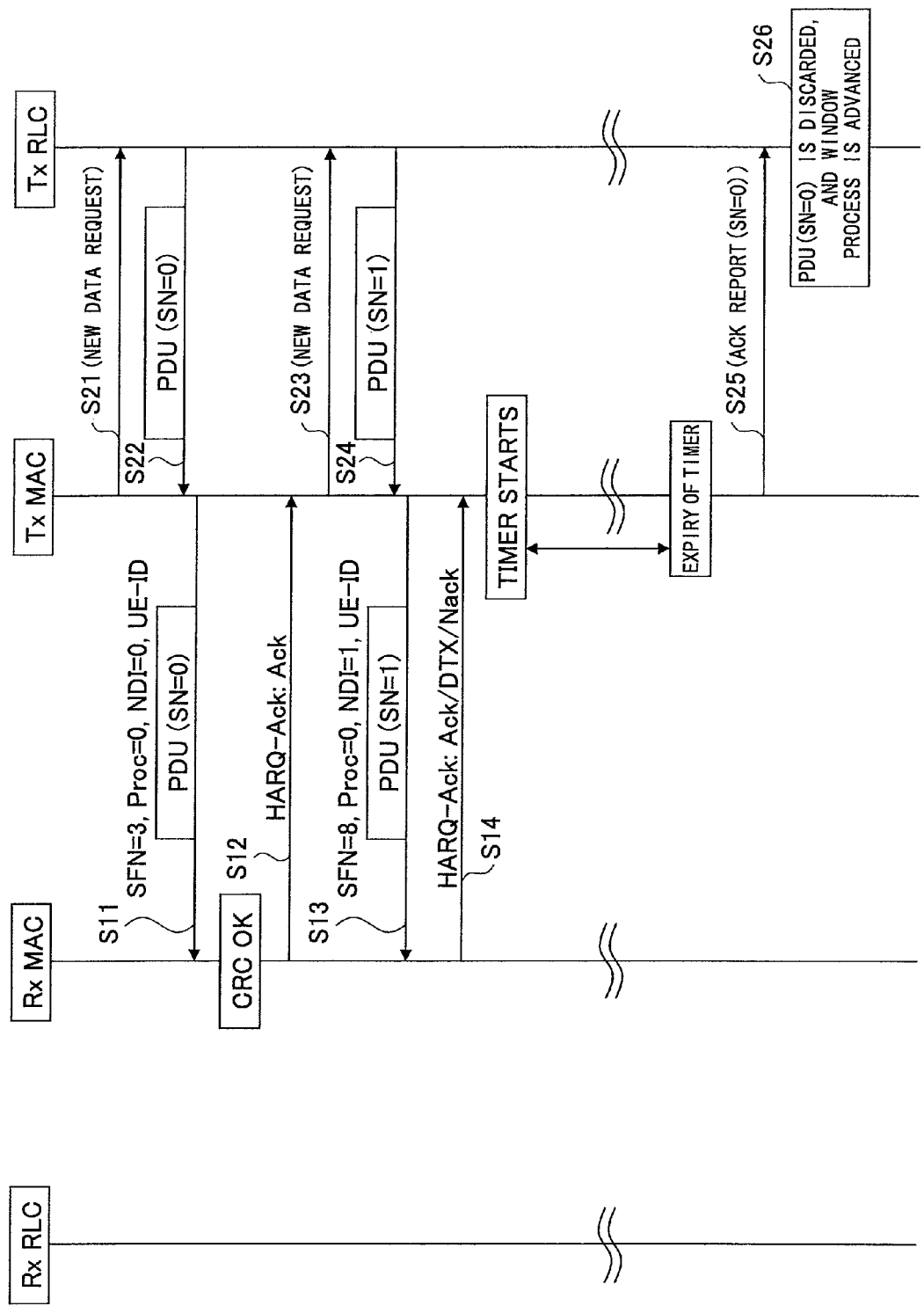
FIG. 3 is a flowchart showing operation procedures according to an example of the present invention.

FIG. 3 shows a flowchart showing operation procedures according to an example of the present invention. The right-hand side of FIG. 3 indicates an entity (Tx MAC) of a Medium Access Control (MAC) sub-layer and an entity (Tx RLC) of a Radio Link Control (RLC) sub-layer on a transmitting side. The left-hand side of FIG. 3 shows an entity (Rx MAC) of a MAC sub-layer and an entity (Rx RLC) of a RLC sub-layer on a receiving side. In downlink, a base station is a transmitter and a user apparatus is a receiver. In uplink, the user apparatus is the transmitter and the base station is the receiver.

At steps S21, S22, a packet to be transmitted is prepared. The MAC sub-layer requests the packet to be transmitted from the RLC sub-layer (new data request). In response to the request, the packet to be transmitted is prepared in the MAC sub-layer. In the illustrated example, a sequence number of "zero" (SN=0) is assigned to this packet, i.e., a packet data unit (PDU).

As shown in step S11, the packet prepared in the transmitting side is transmitted to the receiving side. In this case, the packet data unit including user data specified by the sequence number (SN) is transmitted through a data channel, and other pieces of control information such as user identification information (UE-ID), a process number (Proc), and a new data indicator (NDI) are transmitted through a control channel. A system frame number (SFN) indicating absolute transmission timing within a cell is broadcasted through a broadcast channel, and accordingly is used.

Upon reception of the above information through the broadcast channel, the control channel, and the data channel, the receiver carries out an error detection of, for example but not limited to, a Cyclic Redundancy Check (CRC) with respect to the received packet. Accordingly, an error detection result is negative (NACK) or positive (ACK). The former shows that an error beyond an acceptable range is detected, and the latter shows the contrary. In the illustrated example, an error may be detected or not detected. But when the Cyclic Redundancy Check is successfully completed (CRC: OK), this procedure proceeds to the next step (S12).

As shown in step S12, the error detection result is reported to the transmitting side. If an error is detected, a negative acknowledgement is reported to the transmitting side. The transmitting side in turn identifies a packet related to the negative acknowledgement and retransmits the packet. The packet transmitted from the transmitting side is stored in a buffer (retransmission buffer) after the transmission is completed and discarded when a positive error detection result (ACK) is obtained. Therefore, when a negative error detection result is reported, the packet that has once been transmitted is specified in response to the report and retransmitted.

In the illustrated example, the positive acknowledgement (ACK) is transmitted at step S12. On the contrary to the related art explained above, a timer does not start at this time.

As shown in steps S23, S24, the next packet data are prepared and transmitted as shown in step S13. In the illustrated example, a packet of SN=1 is transmitted along with control information of Proc=0 and NDI=1 at timing of SFN=8.

On the contrary to the related art, the timer is activated after the transmission is carried out at step S13 in this example. The timer measures a predetermined period of time that is shorter than the predetermined period of time in the related art. This is because the predetermined period of time does not need to include the first period T1 that is expectably the longest taking account of great variations while the predetermined period of time needs to include the second period T2 and the third period T3 (FIG. 2) that only slightly varies. When the predetermined period of time passes without the FAI reception, the flow proceeds to step S25.

At step S25, the error detection result indicating the positive acknowledgement is reported to the upper layer (Tx RLC). As a result, the packet (SN=0) subjected to the report is discarded from the retransmission buffer, and the window control is advanced.

In the related art method, a period of time from when the error detection result for the packet (SN=0) subjected to the report is reported at step S12 to when the ACK report is made at step S25 is fixedly set to be long. Even if a period of time from the packet transmission at step S13 to the ACK report at step S25 is greatly increased or decreased and a scheduling delay of the next packet (SN=1) from step S12 to step S13 is small, the period of time from the error detection report for the packet (SN=0) subjected to the report at step S12 to the ACK report at step S25 is unnecessarily lengthened, and waiting is necessary until the fixed period of time passes. In this example, when the scheduling delay of the next packet from step S12 to step S13 is small, the ACK report is readily made after the predetermined period of time passes after a short period of time corresponding to the small scheduling delay. Even when the scheduling delay of the next packet becomes large, the ACK report timing is merely delayed to the same degree as in the related art.

Figure 2:
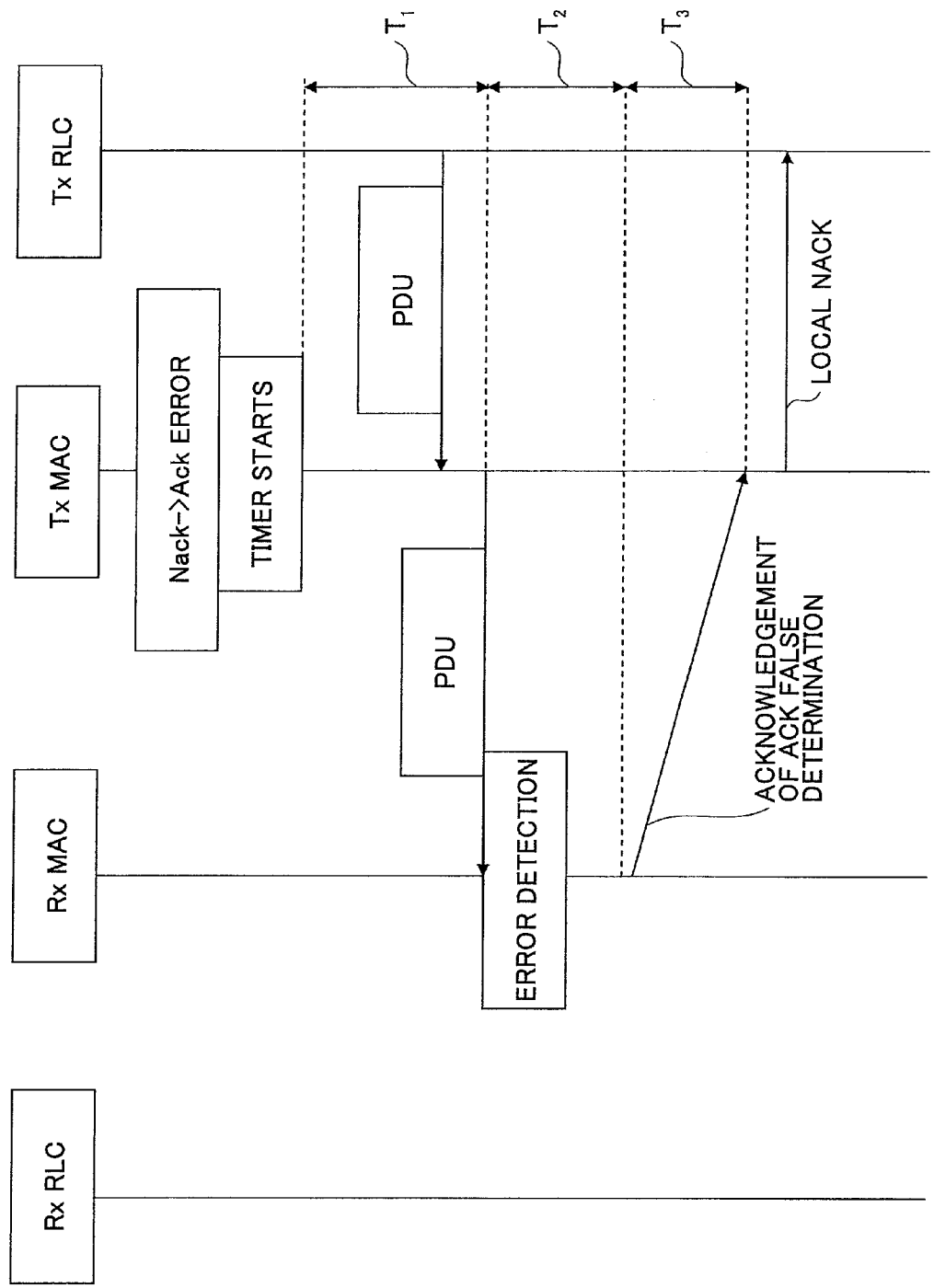
FIG. 2 is a view for explaining a problem in the related art.

FIG. 4 is a functional block diagram of entities used in the example of the present invention. The operation shown in FIG. 2 is realized with functional portions of these entities. The Rx MAC on the receiving side includes a reception portion 11, an ACK/NACK determination portion 12, an error detection portion 13, and an FAI generation portion 14. The Tx MAC on the transmitting side includes a new data request portion 21, a transmission packet generation portion 22, a transmission portion 23, a timer 25, and an FAI analysis portion 24. The Tx RLC on the transmitting side includes a transmission buffer management portion 31.

The reception portion 11 of the Rx MAC on the receiving side receives a radio signal, extracts a signal sent to the receiver of its own, and forwards the signal to process elements at a subsequent stage. In addition, the reception portion 11 of the Rx MAC sends to the error detection portion 13 a process number (Proc), a value of a new data indicator (NDI) and a system frame number (SFN) associated with the control channel that is sent to and received by the receiver of its own.

The ACK/NACK determination portion 12 carries out error detection with respect to the received signal. The error detection may be carried out per CRC method. The error detection result is reported to not only the error detection portion 13 but also the transmitting side.

The error detection portion 13 determines whether a control channel reception was failed in the past. When it is identified that there was a failure, the error detection portion 13 instructs the FAI generation portion 14 to generate the FAI.

The FAI generation portion 14 generates an indicator including the system frame number (SFN) of a packet received in recent history. The indicator is transmitted.

The new data request portion 21 of the Tx MAC in the transmitter receives a report of the error detection result (ACK/NACK) from the receiver. Depending on a content of the report, the new data request portion 21 requests data to be transmitted at the next transmission timing of the transmission management portion 31.

The transmission packet generation portion 22 generates a transmission packet by which data to be transmitted at the next transmission timing is transmitted. The transmission packet constitutes the control channel and the data channel.

The transmission portion 23 transmits the generated transmission packet.

The timer 25 measures the predetermined period of time after the packet is transmitted. When the predetermined period of time passes, the transmission buffer management portion 31 is acknowledged accordingly.

The FAI analysis portion 24 receives the indicator produced on the receiving side, and extracts the system frame number (SFN) included in the indicator.

The extracted SFN is given to the transmission buffer management portion 31.

The transmission buffer management portion 31 of the Tx RLC on the transmitting side stores the packet data to be transmitted in the buffer, retrieves the packet data when necessary, and sends the retrieved packet data to the transmission packet generation portion 22. The buffer stores the packet data to be transmitted at a first transmission and to be retransmitted. The packet data to be retransmitted is stored along with attribute information associated with the packet data. When no FAI is acknowledged during the predetermined period of time measured by the timer 25, the transmission buffer management portion 31 discards the packet indicated by the ACK report from the retransmission buffer.

This international application claims the benefit of the priority date of Japanese Patent Application No. 2006-170704 filed on Jun. 20, 2006, and the entire content of which application is hereby incorporated by reference.

The invention claimed is:
1. A radio communications apparatus having a retransmission function, comprising:
a determination portion configured to receive an error detection result obtained for a first packet transmitted to a destination apparatus and determine in a first sub-layer whether the error detection result is a positive acknowledgement;

a transmission portion configured to transmit a second packet following the first packet to the destination apparatus;

a timer portion configured to measure a predetermined period of time after the second packet is transmitted; and a report portion configured to report to a second sub-layer that is an upper sub-layer of the first sub-layer that the error detection result is the positive acknowledgement when no message is received from the destination apparatus during the predetermined period of time, the message indicating that the error detection result is falsely determined to be the positive acknowledgement.

2. A method for use in a radio communications apparatus having a retransmission function, the method comprising steps of:

transmitting a first packet to a destination apparatus;

receiving an error detection result obtained for the first packet from the destination apparatus;

determining in a first sub-layer whether the error detection result is a positive acknowledgment;

transmitting a second packet following the first packet to the destination apparatus;

measuring a predetermined period of time after the second packet is transmitted; and reporting to a second sub-layer that is an upper sub-layer of the first sub-layer that the error detection result is the positive acknowledgement when no message is received from the destination apparatus during the predetermined period, the message indicating that the error detection result is falsely determined to be the positive acknowledgement.

\* \* \* \* \*